United States Patent [19]

Hopperdietzel

[11] Patent Number: 4,815,769

[45] Date of Patent: Mar. 28, 1989

[54] CONNECTOR FOR HEATABLE HOSES AND HEATABLE HOSE ASSEMBLY

[75] Inventor: Siegfried Hopperdietzel, Selb, Fed. Rep. of Germany

[73] Assignee: Rehau AG + Co., Rehau, Fed. Rep. of Germany

[21] Appl. No.: 184,828

[22] Filed: Apr. 22, 1988

Related U.S. Application Data

[63] Continuation-in-part of Ser. No. 177,384, Apr. 4, 1988.

[30] Foreign Application Priority Data

Apr. 2, 1987 [DE] Fed. Rep. of Germany ....... 8704903

[51] Int. Cl.$^4$ .................... F16L 53/00; F16L 55/00; B05B 1/24; E03B 7/12
[52] U.S. Cl. ........................................ 285/41; 138/33; 239/135; 239/284.1; 285/47; 285/1.55; 285/906
[58] Field of Search .................. 285/41, 47, 239, 155, 285/156; 138/33; 174/47; 219/301; 137/341; 239/284.1, 284.2, 133, 134, 135

[56] References Cited

U.S. PATENT DOCUMENTS

| | | | |
|---|---|---|---|
| 2,750,912 | 6/1956 | King | 285/41 X |
| 3,378,673 | 4/1968 | Hopper | 138/33 X |
| 3,971,416 | 7/1976 | Johnson | 138/33 |
| 4,088,269 | 5/1978 | Schlick | 239/284.1 X |
| 4,203,186 | 5/1980 | Horner | 219/301 X |
| 4,214,147 | 7/1980 | Kraver | 138/33 X |
| 4,360,158 | 11/1982 | Bauer | 239/284.1 |
| 4,447,707 | 5/1984 | Baker | 138/33 X |
| 4,508,957 | 4/1985 | Rocchitelli | 239/135 X |

FOREIGN PATENT DOCUMENTS

| | | |
|---|---|---|
| 85/20557 | of 1985 | Fed. Rep. of Germany . |
| 86/22603 | of 1986 | Fed. Rep. of Germany . |
| 8100775 | 9/1982 | Netherlands ........................ 285/156 |
| 2073011 | 10/1981 | United Kingdom ............. 239/284.1 |

Primary Examiner—Randolph A. Reese
Assistant Examiner—Paul M. Frechette
Attorney, Agent, or Firm—Spencer & Frank

[57] ABSTRACT

A connector for heatable hoses and a heatable hose assembly for transporting fluids. The heatable hose assembly includes at least one heatable hose having a hose wall which defines therein a longitudinal cavity, a first end, and at least one heating wire having a first portion embedded in the hose wall and extending longitudinally therein and a second portion which is an exposed length having a contacting portion extending from the first portion and a connecting portion extending from the contacting portion; and a heat-insulated connector comprised of a connecting element; a heating wire connecting member; and a casing, wherein the connecting element is made of a heat conductive material and has at least one hose insertion end inserted into the longitudinal cavity of the first end and at least one projecting portion extending outwardly from the at least one hose insertion end, wherein the contacting portion is positioned in contact with the at least one projecting portion and wherein the connecting portion is connected to the heating wire connecting member, wherein the heating wire connecting member has a first portion and a second portion; and wherein the casing is made of an insulating material positioned around the connecting element, the first portion of the heating wire connecting member and a portion of the first end to encase same and prevent release thereof, and wherein the second portion of the heating wire connecting member projects outwardly through the casing.

14 Claims, 1 Drawing Sheet

CONNECTOR FOR HEATABLE HOSES AND HEATABLE HOSE ASSEMBLY

CROSS-REFERENCES TO RELATED APPLICATIONS

This application is a continuation-in-part of Ser. No. 07/177,384 filed Apr. 4, 1988.

BACKGROUND OF THE INVENTION

1. Field of the Invention

The present invention relates to a heat-insulated connector for heatable hoses having heating means for preventing freezing in the form of at least one longitudinally extending heating wire embedded in the hose wall and, more particularly, to a heat-insulated connector composed of a connecting element made of a heat conductive material which is partially inserted into the interior of at least one heatable hose and a casing made of an insulating material. The present invention also relates to a heatable hose assembly for transporting fluids.

2. Description of the Related Art

German Utility Model Patent Application No. 86/22,603.7 discloses a heatable hose in which a heating wire is disposed in the hose wall and extends parallel to the longitudinal cavity of the hose interior. The longitudinal cavity is offset to one side with respect to the axis of the hose so that the hose wall is thicker as viewed in cross-section on the side thereof in which the heating wire is embedded. The hose wall region between the longitudinal cavity and the heating wire is thinner in cross-section than the hose wall region between the heating wire and the adjacent surface of the hose to promote good heat transfer to the fluids transported while improving the thermal insulation of the heating wire with respect to the external environment.

German Utility Model Patent Application No. 85/20,557.5 discloses another heatable hose for liquids. This published Application discloses a sleeve connector for establishing a connection between coaxially arranged hose ends. The sleeve is intended for the connection of a cold conduit so as to establish a connection between the heatable hose and an unheated hose section.

SUMMARY OF THE INVENTION

It is an object of the present invention to provide a heat-insulated connector for heatable hoses which provides the anti-freezing advantages of the heated hose to the connector which functions as a connecting or distributing member and, optionally, to a nozzle for delivering the fluids being transported.

It is a further object of the present invention to provide a heatable hose assembly for transporting fluids which includes a heat-insulated connector and at least one heatable hose and which provides the anti-freezing advantages of the heated hose to the connector and, optionally, to a nozzle for delivering the fluids being transported.

These and other objects of the invention are accomplished by providing a heat-insulated connector for at least one heatable hose for transporting fluids which has at least one heating wire embedded therein, including a connecting element made of a heat conductive material and having at least one hose insertion end for insertion during use into at least one heatable hose and having at least one projecting portion extending from the at least one hose insertion end and projecting outwardly during use from the at least one heatable hose. Further included is at least one heating wire positioned around and in contact with the at least one projecting portion of the connecting element and in contact during use with the at least one heating wire of the at least one heatable hose. Still further included is a heating wire connecting member having a first portion and a second portion and to which is connected the at least one heating wire of the heat-insulated connector. Also included is a casing made of an insulating material positioned around the connecting element, the at least one heating wire of the heat-insulated connector and the first portion of the heating wire connecting member to encase same and prevent release thereof, wherein the second portion of the heating wire connecting member projects outwardly through the casing.

In a first embodiment, the heat-insulated connector has a connecting element having a plurality of hose insertion ends and a plurality of heating wires, the heating wires may be joined to from the heating wire connecting member. In this embodiment, the connecting element may be T-shaped, Y-shaped or have any other shape to suit the intended application.

In a second embodiment, the heat-insulated connector has one hose insertion end and includes a nozzle end which opposes the hose insertion end. The connecting element is preferably linear, but may have any other shape to suit the intended application. Preferably, the exposed length of the at least one heating wire extends to and contacts the nozzle end of the connecting element.

These and other objects of the invention are further accomplished by providing a heatable hose assembly for transporting fluids, including at least one heatable hose having a hose wall which defines therein a longitudinal cavity, a first end and a second end, and at least one heating wire having a first portion embedded in the hose wall and extending longitudinally therein and a second portion which is an exposed length having a contacting portion extending from the first portion and a connecting portion extending from the contacting portion. Further included are a heat-insulated connector; a heating wire connecting member; and a casing. The connecting element is made of a heat conductive material and has at least one hose insertion end and at least one projecting portion. The at least one hose insertion end is inserted into the longitudinal cavity of the first end of the at least one heatable hose and the at least one projecting portion extends outwardly from the at least one hose insertion end. The contacting portion of the exposed length of the at least one heating wire is positioned in contact with the at least one projecting portion of the connecting element and the connecting portion of the exposed length of the at least one heating wire is connected to the heating wire connecting member. The heating wire connecting member has a first portion and a second portion. The casing is made of an insulating material positioned around the connecting element, the first portion of the heating wire connecting member, and that portion of the first end of the at least one heatable hose into which the at least one hose insertion end is inserted to encase same and prevent release thereof. The heating wire connecting member projects outwardly through the casing.

The connecting element may be, for example, a small tube of heat conductive material, such as copper, aluminum or plastic, whose outer dimensions must approximately correspond to the interior dimensions of the longitudinal cavity of the heatable hose so as to be insertable into the interior of the heatable hose. This connecting element may project linearly, i.e., axially, from the interior of the heatable hose or it may have a Y- or T- shape or may be shaped in some other suitable manner.

Preferably, the ends of the hose walls are removed to expose the heating wires associated with the individual hoses and the exposed wires are positioned to contact the portion or portions of the connecting element which project from the interior of the heatable hose or hoses. Subsequent encasing of the assembly of connector and heatable hose or hoses thus securely joins the components to prevent release thereof. Alternately, although less preferably, heating wires may be positioned in the connector and the ends of the heating wires of the respective hoses connected to the wires of the connector, followed by sealing of the connections with a suitable insulating material.

The heating wire is preferably wound around the portion of the connecting element which project from the interior of the heatable hose, with the end of the heating wire projecting from the connector in the manner of a flat plug, i.e., a heating wire connecting member, once the unit has been encased. A connecting unit to connect to a source of electrical power the electrical heating element, i.e., the heating wire or wires, is then pushed onto this flat plug member.

In the second embodiment in which a connecting element extends axially along the interior of the heatable hose, the heating wire may be wound in helical turns onto the part of the connecting element which projects from the hose interior. If, as in the first embodiment of the invention, the connecting element has the shape, for example, of a Y and is intended to connect a plurality of heatable hoses, the exposed heating wires are wound around the base of the Y-shaped connecting element and are bundled. The bundle of wire may be brought out of the casing in such a manner that a uniform heating wire connecting member, preferably in the form of a flat plug, is provided or the bundle of wire may be connected to a heating wire connecting member. This wound structure may also be selected to advantage for T-shaped connecting elements or other configurations of these connecting elements. In this connection, it should be emphasized that the plurality of heatable hoses, which are connected together by the connecting element, may be heated through only one connecting unit to connect to a source of electrical power in that their heating wires are brought out of the connector as a unit either directly or indirectly.

Encasing the connecting elements constructed according to the invention is effected with a compact, corrosion and vibration resistant material which is a thermally insulating material. This material additionally must be non-conductive since the introduction of heat is effected only through the heating wire connecting member in the form of the flat plug. An example of such a material is a silicon elastomer. Other examples of such materials are polyethylene, polyvinylchloride, polystyrene and all other polymer materials which can be cemented or wel ded to the exterior end of the hose to be connected.

The particular advantage of the embodiments according to the invention is that the connecting elements are heated by means of the heatable hoses and that no further electrical connections are required for this purpose.

It has been found to be particularly advantageous that heating wires are wound around the projecting portions of the connecting elements which project from the interior of the hoses. These windings fully heat the circumference of the projecting portions and the intensity of the heat can be determined by the number and placement of the turns, i.e., by the spacing of the individual wires of the winding from one another.

Advisably a plurality of heating wires from a plurality of hoses are combined to heat the connecting element. Thus it is possible to heat the connecting element as well as the associated heatable hoses by way of a single heating wire connecting member plugged into a connecting unit which is a source of electrical power.

At the free end facing away from the end of the hose, the connecting element may be adapted to have a nozzle opening or may be provided with a nozzle end in which is defined a nozzle opening. This arrangement has the advantage that the windings of the heating wire can be extended beyond the projecting portion of the connecting element into the region of the nozzle opening to contact the nozzle end. In this way, the nozzle end and opening can also be heated, thus preventing disadvantageous freezing in this region which would interrupt delivery of the fluid being transported.

BRIEF DESCRIPTION OF THE DRAWING

The drawing figures are schematic illustrations of embodiments of the connector for heatable hoses and heatable hose assembly in which.

DESCRIPTION OF THE PREFERRED EMBODIMENTS

Figure 1:
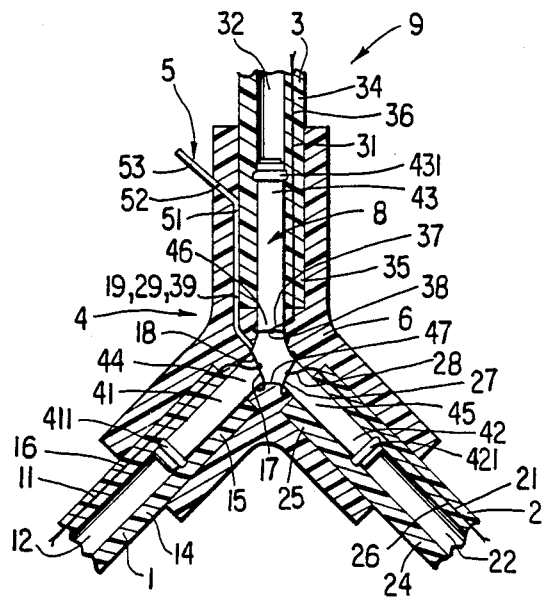
FIG. 1 shows a heatable hose assembly including a Y-shaped connector and three heatable hoses.

FIG. 1 shows a heatable hose assembly 9 having heat-insulated connector 4 and three heatable hoses 1, 2 and 3 which are tubular hoses 1, 2, 3 having respective hose walls 14, 24, 34 which define therein respective longitudinal cavities 12, 22, 32. At first ends 15, 25, 35, of these hoses 1, 2 and 3, a portion of hose walls 14, 24, 34 has been removed so that embedded heating wires 11, 21 and 31 are exposed to a given exposed length 17, 27, 37 along a second portion thereof while a first portion 16, 26, 36 thereof remains embedded. Exposed lengths 17, 27, 37 have respective contacting portions 18, 28, 38 for contacting the connecting element 8 and respective connecting portions 19, 29, 39 extending from the respective contacting portions 18, 28, 38 and connecting with a heating wire connecting member 5.

In FIG. 1, ends 41, 42 and 43 of Y-shaped connecting element 8 are hose insertion ends 41, 42, 43 and are inserted into the longitudinal cavities 12, 22 and 32 of hoses 1, 2 and 3. At the hose insertion ends 41, 42 and 43 of connecting element 8, thickened portions 411, 421 and 431 may be provided proximate the ends thereof for better support within the longitudinal cavities 12, 22 and 32 of hoses 1, 2 and 3. Exposed lengths 17, 27, 37 of heating wires 11, 21 and 31 are wound around projecting portions 44, 45, 46 and 47 of connecting element 8 where projecting portions 44, 45, 46 project respectively from longitudinal cavities 12, 22 and 32 of hoses 1, 2, and 3. Heating wires 11, 21 and 31 are combined into a heating wire bundle 51 which is a bundle of connecting portions 19, 29, 39 of exposed lengths 17, 27, 37 and preferably form the heating wire connecting member 5. This structure is then encased in a casing 6 of insulating material such that a first portion 52 of heating wire connecting member 5 is encased while a second portion 53 of heating wire connecting member 5 projects outwardly from casing 6 in the form of a flat plug. Casing 6 causes the entire described structure to act as a compact, heat-insulated connector 4 for the three described heatable hoses 1, 2 and 3, with a single heating wire connecting member 5 serving to provide heat for hoses 1, 2 and 3 and for heat-insulated connector 4.

Figure 2:
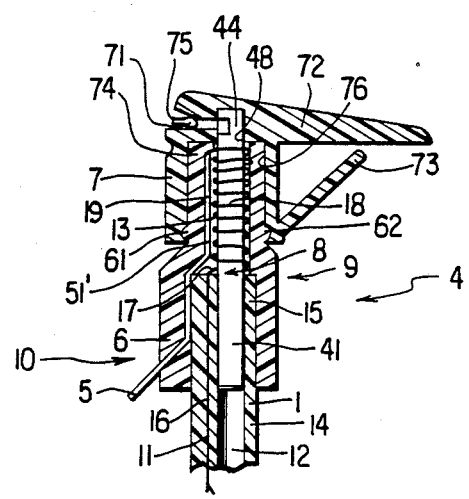
FIG. 2 shows a heatable hose assembly including a linear connector, one heatable hose, a nozzle end, and a covering tab and catch.

In contrast to the illustration in FIG. 1, FIG. 2 shows a heat-insulated connector 4 which is linear and whose hose insertion end 41 is inserted into the longitudinal cavity 12 of hose 1 at the free first end 15 of the latter. Exposed length 17 of heating wire 11 is wound around projecting portion 44 of connecting element 8 where it projects from the longitudinal cavity 12 of hose 1, with turns 13 being formed by contacting portions 18 of exposed length 11 and being placed close together throughout the projecting portion 44. The outer end of these turns 13 extends as connecting heating wire 51', which is connecting portion 19 of exposed length 17, to heating wire connecting member 5. This configuration is encased in a casing 6 of insulating material to form a heatable hose assembly 9 which is a compact block element.

This compact block element is a lower part 10 of a heated windshield washer nozzle for motor vehicles. An upper part 7 is clipped to this lower part and is equipped with a nozzle end 71 which is connected with interior 48 of the projecting portion 44 of connecting element 8 and which has defined therein a nozzle opening 75. Upper part 7 is provided with a covering tab 72 and a catch 73. It is pressed from the top into a suitable opening, e.g., a recess provided in the hood of a motor vehicle (not shown), and is automatically caught there by way of catch 73. Covering tab 72 additionally covers the opening of the recess. The portion of the lower part 10 provided with turns 13 of heating wire 11 is now pressed from the bottom into receiving aperture 76 of upper part 7 and is there fixed in its seat by means of detent elements 61 and 62. In this way, it is simultaneously possible to heat the nozzle end 71 by way of the heatable hose 1 so that freezing in this sensitive region can be prevented.

The present disclosure relates to the subject matter disclosed in Federal Republic of Germany Patent Application No. G 86 22 603.7, filed Aug. 21st, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A heat-insulated connector for at least one heatable hose for transporting fluids which has at least one heating wire embedded therein, comprising:
   a connecting element made of a heat conductive material and having at least one hose insertion end for insertion during use into at least one heatable hose and having at least one projecting portion extending from the at least one hose insertion end and projecting outwardly during use from the at least one heatable hose;
   at least one heating wire positioned in contact with the at least one projecting portion of the connecting element and in contact during use with the at least one heating wire of the at least one heatable hose;
   a heating wire connecting member having a first portion and a second portion and to which is connected the at least one heating wire of the heat-insulated connector;
   a casing made of an insulating material positioned around the connecting element, the at least one heating wire of the heat-insulated connector and the first portion of the heating wire connecting member to encase same and prevent release thereof, wherein the second portion of the heating wire connecting member projects outwardly through the casing.

2. The heat-insulated connector according to claim 1, wherein the connecting element has a plurality of hose insertion ends and wherein the heat-insulated connector has a plurality of heating wires which are joined to form the heating wire connecting member.

3. The heat-insulated connector according to claim 1, wherein the at least one heating wire of the heat-insulated connector is wound around the at least one projecting portion of the connecting element.

4. The heat-insulated connector according to claim 3, wherein the connecting element has a plurality of hose insertion ends and wherein the heat-insulated connector has a plurality of heating wires which are joined to form the heating wire connecting member.

5. The heat-insulated connector according to claim 1 wherein the connecting element is one of linear, T-shaped, and Y-shaped.

6. The heat-insulated connector according to claim 1, wherein the connecting element has one hose insertion end and further comprises a nozzle end which opposes the hose insertion end, which nozzle end has defined therein a nozzle opening.

7. The heat-insulated connector according to claim 6, wherein the at least one heating wire of the heat-insulated connector extends to and contacts the nozzle end of the connecting element.

8. A heatable hose assembly for transporting fluids, comprising:
   at least one heatable hose having a hose wall which defines therein a longitudinal cavity, a first end, and at least one heating wire having a first portion embedded in the hose wall and extending longitudinally therein and a second portion which is an exposed length having a contacting portion extending from the first portion and a connecting portion extending from the contacting portion; and
   a heat-insulated connector comprised of a connecting element; a heating wire connecting member; and a casing,
   wherein the connecting element is made of a heat conductive material and has at least one hose insertion end and at least one projecting portion, which at least one hose insertion end is inserted into the longitudinal cavity of the first end of the at least one heatable hose and which at least one projecting portion extends outwardly from the at least one hose insertion end, wherein the contacting portion of the exposed length of the at least one heating wire is positioned in contact with the at least one projecting portion of the connecting element and wherein the connecting portion of the exposed length of the at least one heating wire is connected to the heating wire connecting member, wherein the heating wire connecting member has a first portion and a second portion; and wherein the casing is made of an insulating material positioned around the connecting element, the first portion of the heating wire connecting member and that portion of the first end of the at least one heatable hose into which the at least one hose insertion end is inserted to encase same and prevent release thereof, and wherein the second portion of the heating wire connecting member projects outwardly through the casing.

9. The heatable hose assembly according to claim 8, wherein the heatable hose assembly comprises a plurality of heatable hoses each having at least one heating wire whereby the heatable hose assembly has a plurality of heating wires, and wherein the connecting portion of each of the plurality of heating wires are joined to form the heating wire connecting member.

10. The heatable hose assembly according to claim 8, wherein the contacting portion of the exposed length of the at least one heating wire is wound around the at least one projecting portion.

11. The heatable hose assembly according to claim 10, wherein the heatable hose assembly comprises a plurality of heatable hoses each having at least one heating wire whereby the heatable hose assembly has a plurality of heating wires, and wherein the connecting portion of each of the plurality of heating wires are joined to form the heating wire connecting member.

12. The heatable hose assembly according to claim 8, wherein the connecting element is one of linear, T-shaped, and Y-shaped.

13. The heatable hose assembly according to claim 8, wherein the connecting element has one hose insertion end and further comprises a nozzle end which opposes the hose insertion end, which nozzle end has defined therein a nozzle opening.

14. The heatable hose assembly according to claim 13, wherein the exposed length of the at least one heating wire extends to and contacts the nozzle end of the connecting element.

* * * * *